United States Patent
Horiuchi (10) Patent No.: US 9,290,064 B2
(45) Date of Patent: Mar. 22, 2016

(54) PNEUMATIC TIRE

(71) Applicant: The Yokohama Rubber Co., LTD., Minato-ku, Tokyo (JP)

(72) Inventor: Kenji Horiuchi, Kanagawa (JP)

(73) Assignee: The Yokohama Rubber Co., LTD. (JP)

( * ) Notice: Subject to any disclaimer, the term of this patent is extended or adjusted under 35 U.S.C. 154(b) by 207 days.

(21) Appl. No.: 13/845,616

(22) Filed: Mar. 18, 2013

(65) Prior Publication Data

US 2013/0248072 A1    Sep. 26, 2013

(30) Foreign Application Priority Data

Mar. 23, 2012  (JP) ................................. 2012-067390

(51) Int. Cl.
  *B60C 17/00*  (2006.01)
  *B60C 17/08*  (2006.01)

(52) U.S. Cl.
  CPC .............. *B60C 17/00* (2013.01); *B60C 17/0009* (2013.04); *B60C 17/0027* (2013.04); *B60C 2013/006* (2013.04); *B60C 2013/007* (2013.04); *B60C 2015/061* (2013.04); *B60C 2017/0063* (2013.04); *B60C 2017/0072* (2013.04)

(58) Field of Classification Search
  CPC .... B60C 15/00; B60C 15/0009; B60C 17/00; B60C 17/0009; B60C 17/0027
  See application file for complete search history.

(56) References Cited

U.S. PATENT DOCUMENTS

| 4,766,940 A * | 8/1988 | Yokoyama et al. ........... 152/541 |
| 6,230,773 B1 * | 5/2001 | Sandstrom et al. ........... 152/517 |
| 2003/0015272 A1 * | 1/2003 | Teratani et al. ............... 152/406 |
| 2004/0187995 A1 * | 9/2004 | Yoshinaka ..................... 152/454 |

FOREIGN PATENT DOCUMENTS

EP  1002668  * 5/2000
JP  2010023823  2/2010

* cited by examiner

*Primary Examiner* — Justin Fischer
(74) *Attorney, Agent, or Firm* — Thorpe North & Western (57) ABSTRACT

In a pneumatic tire, a height from a turned-up edge of a carcass layer is not more than 10 mm, a distance from a tire outer surface to the carcass layer is not less than 50% of the total gauge, a height of the bead filler is from 50% to 80% of a tire cross-section height, a cross-sectional area ratio $V_B/V_R$ of the bead filler to a side reinforcing layer is not less than 0.4 and not more than 0.6, a hardness $Hs_B$ of the bead filler is not less than 65 and not more than 80, and the hardness $Hs_R$ of the side reinforcing layer is not less than 75 and not more than 85, a size relationship between the hardness $Hs_B$ and the hardness $Hs_R$ is $Hs_B \leq Hs_R$, a value $T_B$ of tan δ is not more than 0.06, and a value $T_R$ of tan δ is not more than 0.05.

14 Claims, 2 Drawing Sheets

PNEUMATIC TIRE

PRIORITY CLAIM

Priority is claimed to Japan Patent Application Serial No. 2012-067390 filed on Mar. 23, 2012.

BACKGROUND

With pneumatic tires, a side-reinforced pneumatic run flat tire in which a reinforcing rubber layer having a falcated cross-section is inserted on an inner face of a side wall portion, and by which run-flat traveling is made possible based on the rigidity of this reinforcing rubber layer is known (e.g. see Japanese Unexamined Patent Application Publication No. 2010-023823A). With such a side reinforced pneumatic run flat tire, there is a benefit in that run-flat traveling is achieved based on the tire structure without depending on a support body such as an inner ring or the like attached to the wheel, but there is also a problem in that the rigidity of the side wall portion is higher than that of a regular tire and, therefore, riding comfort when regular traveling is negatively affected.

Therefore, what are referred to as "soft run-flat tires" have been used in which the same degree of riding comfort as in a tire that does not have a reinforcing rubber layer is maintained while at least the minimum necessary run-flat durability is ensured by miniaturizing the reinforcing rubber layer as much as possible without inhibiting run-flat durability or reducing the rigidity. In particular, in recent years, it has become possible to reduce the tire rigidity without significantly inhibiting the run-flat durability. However, these run-flat tires with reduced tire rigidity tend to be easily damaged due to rupture of the carcass in an upper portion of a bead core. Therefore, run-flat durability and riding comfort when regular traveling are not necessarily both achieved, and there was still scope for improvement of both run-flat durability and riding comfort when regular traveling.

SUMMARY

The present technology provides a pneumatic tire, and more particularly a pneumatic tire by which both riding comfort when regular traveling and run-flat durability can be achieved at high levels.

The present technology provides a pneumatic tire with a falcated cross-section side reinforcing layer in the side wall portion, in which both riding comfort when regular traveling and run-flat durability can be achieved at high levels. The pneumatic tire according to the present technology is a pneumatic tire comprising at least one layer of carcass layer mounted between a pair of left and right bead portions, the carcass layer being folded from the tire inside to the tire outside around bead cores disposed in each bead portion, a bead filler constituted by a rubber composition being disposed on an outer circumferential side of the bead cores, a plurality of belt layers being disposed on an the outer circumferential side of the carcass layer in a tread portion, a plurality of belt cover layers being disposed on an outer circumferential side of the belt layers, and a falcated cross-section side reinforcing layer being disposed inward in a tire width direction of the carcass layer in side wall portions; wherein a height $H_T$ from the turned-up edge of the carcass layer to an outer edge in a tire radial direction of the bead core is not more than 10 mm; when fitted to a rim, on an imaginary line L drawn from an outermost edge in the tire radial direction of a region in contact with the rim flange normal to the tire inner surface, a distance $G_O$ from the tire outer surface to the carcass layer is not less than 50% of the total gauge $G_T$ of the side wall portion on the imaginary line L; a height $H_B$ of the outer edge in the tire radial direction of the bead filler is from 50% to 80% of the tire cross-section height SH; a ratio $V_B/V_R$ of the cross-sectional area $V_B$ of the bead filler to the cross-sectional area $V_R$ of the side reinforcing layer is not less than 0.4 and not more than 0.6; a hardness $Hs_B$ at 20° C. of the rubber composition of the bead filler is not less than 65 and not more than 80; a hardness $Hs_R$ at 20° C. of the rubber composition of the side reinforcing layer is not less than 75 and not more than 85; the hardness $Hs_B$ and the hardness $Hs_R$ satisfy the relationship $Hs_B \leq Hs_R$; a dynamic elastic modulus $E'_B$ at 60° C. of the rubber composition of the bead filler is not less than 7.0 MPa and not more than 15.0 MPa; a dynamic elastic modulus $E'_R$ at 60° C. of the rubber composition of the side reinforcing layer is not less than 7.0 MPa and not more than 15.0 MPa; a value $T_B$ of tan δ at 60° C. of the rubber composition of the bead filler is not more than 0.06; and a value $T_R$ of tan δ at 60° C. of the rubber composition of the side reinforcing layer is not more than 0.05.

As described above, in the present technology, the height $H_T$ of the turned-up edge of the carcass layer is made low, the tire rigidity is reduced, and the tire weight is reduced, and on the other hand, when fitted to a rim, the distance $G_O$ from the tire outer surface at a region in contact with the rim flange to the carcass layer is ensured, a rubber gauge around beads for which there is concern regarding damage associated with the reduction in tire rigidity is ensured, and the minimum level of rigidity is ensured, so it is possible to improve the riding comfort during regular traveling while ensuring run-flat durability. In addition, the height $H_B$ of the outer edge in the tire radial direction of the bead filler and the cross-sectional area ratio $V_B/V_R$ of the bead filler to the side reinforcing layer are set to suppress a local difference in rigidity of the side wall portion, and the hardness of rubber compositions at 20° C. and dynamic elastic moduli of the rubber compositions at 60° C. of the bead filler and the side reinforcing layer are prescribed so that sufficient tire rigidity is obtained, and the run-flat durability is maintained at a high level by prescribing the size relationship for the range of the value of tan δ at 60° C., so it is possible to effectively improve the riding comfort while maintaining the high level of run-flat durability.

At this time, preferably, the dynamic elastic modulus $E'_B$ and the dynamic elastic modulus $E'_R$ satisfy the relationship $E'_B \leq E'_R$. As a result, local differences in rigidity in the side wall portion are suppressed, and it is possible to effectively achieve both run-flat durability and riding comfort.

In the present technology, preferably, the side reinforcing layer is constituted by two types of rubber compositions having different dynamic elastic moduli at 60° C. that are laminated in the tire radial direction, the dynamic elastic modulus $E'_{RO}$ at 60° C. of the rubber composition of the outer diameter side side reinforcing layer located on an outer side in the tire radial direction and the dynamic elastic modulus $E'_{RI}$ at 60° C. of the rubber composition of the inner diameter side side reinforcing layer located on an inner side in the tire radial direction satisfy the relationship $E'_{RO} < E'_{RI}$. In this way, it is possible to relieve the input from the tire road contact surface without reducing the rigidity around the beads, and it is possible to improve the riding comfort when regular traveling without significantly reducing the run-flat durability.

At this time, preferably, the size relationship between the dynamic elastic modulus $E'_B$ and the dynamic elastic modulus $E'_{RI}$ satisfies the relationship $E'_B \leq E'_{RI}$. As a result, both run-flat durability and riding comfort when regular traveling can be more effectively achieved.

In the present technology, preferably, the bead filler is constituted by two types of rubber compositions having different dynamic elastic moduli at 60° C. that are laminated in the tire radial direction, the dynamic elastic modulus $E'_{BO}$ at 60° C. of the rubber composition of the outer diameter side bead filler located on the outer side in the tire radial direction and the dynamic elastic modulus $E'_{BI}$ at 60° C. of the rubber composition of the inner diameter side bead filler located on the inner side in the tire radial direction satisfy the relationship $E'_{BO} < E'_{BI}$. In this way, it is possible to further strengthen around the beads, and reduce the volume of the side reinforcing layer, the side wall rubber, and the bead filler. Also, the dynamic elastic modulus of the outer diameter side bead filler is relatively low, so it is possible to suppress the vertical spring and achieve further improvement in the riding comfort, without a major reduction in the run-flat durability.

At this time, preferably, the size relationship between the dynamic elastic modulus $E'_{BO}$ and the dynamic elastic modulus $E'_R$ satisfies the relationship $E'_{BO} \leq E'_R$. As a result, both run-flat durability and riding comfort when regular traveling can be more effectively achieved.

In the present technology, a belt cover layer is preferably constituted by a composite cord including two types of organic fibers having differing properties. It is particularly preferable that this composite cord includes an organic fiber having relatively high shrinkage and low elasticity and an organic fiber having relatively low shrinkage and high elasticity. As a result, it is possible to suppress buckling of the tread during run-flat traveling, further improve the run-flat durability, and increase the riding comfort during run-flat traveling.

In the present technology, "hardness at 20° C." refers to the durometer hardness in accordance with JIS K 6253, and is the value measured using a type A durometer under 20° C. conditions. Additionally, in the present technology, "dynamic elastic modulus E' at 60° C." refers to the value measured in accordance with JIS K6394 using a viscoelastic spectrometer (manufactured by Toyo Seiki Seisaku-sho, Ltd.) under the following conditions: temperature=60° C.; frequency=20 Hz; static distortion=10%; and dynamic distortion=±2%. Additionally, in the present technology, "tan δ at 60° C." refers to the value measured in accordance with JIS K6394 using the same viscoelastic spectrometer (manufactured by Toyo Seiki Seisaku-sho, Ltd.) described above under the following conditions: temperature=60° C.; frequency=20 Hz; static distortion=10%; and dynamic distortion=±2%.

DETAILED DESCRIPTION

Detailed descriptions will be given below of a configuration of the present technology with reference to the accompanying drawings.

Figure 1:
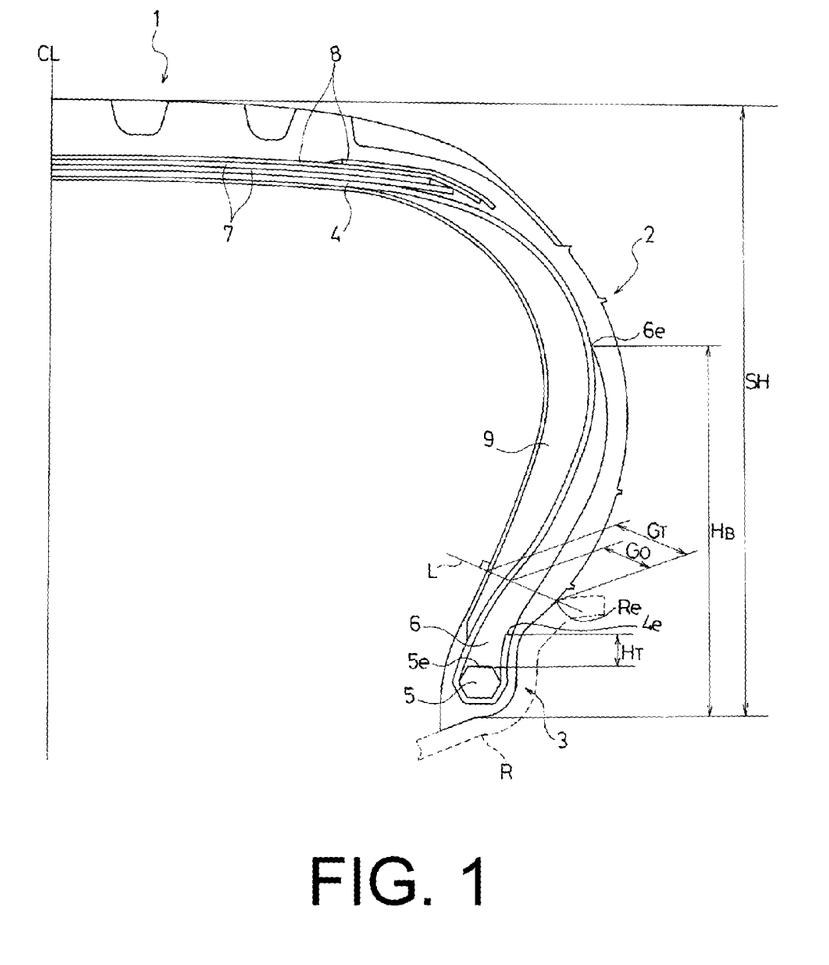
FIG. 1 is a meridian cross-sectional view illustrating a pneumatic tire according to an embodiment of the present technology.

FIG. 1 illustrates a pneumatic tire according to an embodiment of the present technology. In FIG. 1, 1 is a tread portion; 2 is a side wall portion; and 3 is a bead portion. Two layers of a carcass layer 4 are mounted between a pair of left and right bead portions 3,3. Ends of the carcass layer 4 are folded around bead cores 5 from a tire inner side to a tire outer side. A bead filler 6 having a triangular cross-sectional shape formed from rubber is disposed on an outer circumferential side of the bead cores 5. Two layers of a belt layer 7 are disposed throughout an entirety of a circumference of the tire on the outer circumferential side of the carcass layer 4 in the tread portion 1. These belt layers 7 include reinforcing cords that incline with respect to a tire circumferential direction and the reinforcing cords are disposed between the layers so as to intersect each other. Furthermore, a belt cover layer 8 is disposed on the outer circumferential side of the belt layers 7.

The belt cover layer 8 includes a reinforcing cord that is disposed in the tire circumferential direction, and is constituted by continuously wrapping the reinforcing cord in the tire circumferential direction.

In this pneumatic tire, a side reinforcing layer 9 having a falcated cross-section and being formed from rubber is disposed on the inner side in the tire width direction of the carcass layer 4 in the side wall portion 2. The side reinforcing layer 9 is configured so as to be harder than the other rubber of the side wall portion. The load when run-flat traveling is supported based on the rigidity of the side reinforcing layer 9 as a result of providing the side reinforcing layer 9 having the falcated cross-section as described above. The present technology is applied to such a side reinforced type of pneumatic run flat tire, however, the specific structure thereof is not limited to the basic structure described above.

In the present technology, a height $H_T$ of a turned-up edge 4e of the carcass layer 4 from an edge 5e in a tire radial direction of the bead core 5 is not more than 10 mm. Also, when the tire is assembled on a standard rim prescribed by a standard and filled with air to the air pressure corresponding to the maximum load capacity prescribed by a standard, on an imaginary line L drawn from an outermost edge Re in the tire radial direction of a region in contact with a rim flange R (indicated with a broken line in the drawing) normal to the tire inner surface, a distance $G_O$ from the tire outer surface to the carcass layer is not less than 50% of the total gauge $G_T$ of the side wall portion on the imaginary line L. In addition, a height $H_B$ of an edge 6e in the tire radial direction of the bead filler 6 is configured to be from 50 to 80% of a tire cross-section height SH. On the other hand, a cross-sectional area $V_B$ of the bead filler 6 and a cross-sectional area $V_R$ of the side reinforcing layer 9 are configured so that the ratio $V_B/V_R$ is not less than 0.4 and not more than 0.6.

The standard referred to in the present technology is a Japan Automobile Tire Manufacturers Association (JATMA) specification in cases where the tire complies with a JATMA standard, and when not compliant with a JATMA standard, is a Tire and Rim Association (TRA) standard when the tire complies with a TRA standard, and is a European Tyre and Rim Technical Organisation (ETRTO) standard when the tire complies with an ETRTO standard.

The pneumatic tire according to the present technology has the cross-sectional structure as described above, and, in addition, the hardness $Hs_B$ of the rubber composition at 20° C. of the bead filler 6 is not less than 65 and not more than 80, the hardness $Hs_R$ of the rubber composition at 20° C. of the side reinforcing layer 9 is not less than 75 and not more than 85, and the hardness $Hs_B$ and the hardness $Hs_R$ satisfy the relationship $Hs_B \leq Hs_R$. Also, the dynamic elastic modulus $E'_B$ at 60° C. of the rubber composition of the bead filler 6 is not less than 7.0 MPa and not more than 15.0 MPa, and the dynamic elastic modulus $E'_R$ at 60° C. of the rubber composition of the side reinforcing layer 9 is not less than 7.0 MPa and not more than 15.0 MPa. Also, the value $T_B$ of tan δ at 60° C. of the rubber composition of the bead filler 6 is not more than 0.06, and the value $T_R$ of tan δ at 60° C. of the rubber composition of the side reinforcing layer 9 is not more than 0.05.

By configuring the pneumatic tire according to the present technology as described above, the height $H_T$ of the turned-up edge 4e of the carcass layer 4 is low, so it is possible to reduce the tire rigidity and reduce the tire weight, and improve the riding comfort when regular traveling. On the other hand, when assembled on a rim, and the distance $G_O$ from the tire outer surface in the region in contact with the rim flange R to the carcass layer 4 is ensured, the rubber gauge is ensured around the bead portion 5 where there is concern regarding damage associated with reduction in tire rigidity, so it is possible to ensure the minimum level of rigidity necessary for run-flat traveling. As a result, it is possible to enhance riding comfort when regular traveling while ensuring run-flat durability. In addition, the height $H_B$ of the outer edge 6e in the tire radial direction of the bead filler 6 and the cross-sectional area ratio $V_B/V_R$ of the bead filler 6 to the side reinforcing layer 9 are set to suppress the local difference in rigidity of the side wall portion 2. Also, the hardness at 20° C. and the dynamic elastic moduli at 60° C. of the rubber compositions of the bead filler 6 and the side reinforcing layer 9 are prescribed so that sufficient tire rigidity is obtained. In addition, the run-flat durability is maintained at a high level by prescribing the size relationship for the range of the value of tan δ at 60° C., so it is possible to effectively improve the riding comfort while maintaining the high level of run-flat durability.

In this case, if the height $H_T$ of the turned-up edge 4e of the carcass layer 4 is greater than 10 mm, it is not possible to sufficiently reduce the tire rigidity and tire weight, so it is not possible to sufficiently obtain the effect of riding comfort when regular traveling. The lower limit value of the Height $H_T$ of the turned-up edge 4e of the carcass layer 4 is preferably 3 mm from the point of view of productivity.

Also, if the distance $G_O$ is less than 50% of the total gauge $G_T$, it is not possible to ensure sufficient rubber gauge around the bead portion 5, so the rigidity of this site becomes too low, and the run-flat durability is reduced. Preferably, the upper limit value of the distance $G_O$ is 75% of the total gauge $G_T$, from the point of view of suppressing unnecessary increase in the tire weight.

Also, when the height $H_B$ of the outer edge 6e in the tire radial direction of the bead filler 6 is less than 50% of the tire cross-section height SH, the rigidity of the bead portion 3 side of the side wall portion 2 is relatively high, so a local difference in rigidity is produced which reduces the riding comfort when regular traveling. Conversely, when the height $H_B$ of the outer edge 6e in the tire radial direction of the bead filler 6 is greater than 80% of the tire cross-section height SH, the rigidity of the whole side wall portion 2 (in particular, the region near the tread portion 1) becomes too high, and the riding comfort when regular traveling is reduced.

Also, when the cross-sectional area ratio $V_B/V_R$ is less than 0.4, the bead filler becomes relatively small, and the riding comfort when regular traveling is reduced. Conversely, when the cross-sectional area ratio $V_B/V_R$ is greater than 0.6, the side reinforcing layer 9 becomes relatively small, so it is not possible to obtain sufficient run-flat durability. Preferably, the cross-sectional area $V_B$ of the bead filler 6 is from 2.0 cm$^2$ to 4.0 cm$^2$, and preferably the cross-sectional area $V_R$ of the side reinforcing layer 9 is from 4.0 cm$^2$ to 7.0 cm$^2$.

Also, when the hardness $Hs_B$ at 20° C. of the rubber composition of the bead filler 6 is less than 65, the tire durability becomes poor. Conversely, when the hardness $Hs_B$ is greater than 80, the rigidity of the side wall portion becomes too high, so the riding comfort when regular traveling is reduced. On the other hand, when the hardness $Hs_R$ at 20° C. of the rubber composition of the side reinforcing layer 9 is less than 75, the reinforcing effect of the side reinforcing layer 9 is not sufficiently obtained, and the run-flat durability is reduced. Conversely, when the hardness $Hs_R$ is greater than 85, the rigidity of the side wall portion becomes too high, so the riding comfort when regular traveling is reduced. In addition, if the size relationship between the hardness $Hs_B$ and the hardness $Hs_R$ is reversed, and $Hs_B > Hs_R$, the side reinforcing layer 9 has a relatively low hardness, so sufficient run-flat durability cannot be obtained.

If the dynamic elastic modulus $E'_B$ at 60° C. of the rubber composition of the bead filler 6 is less than 7.0 MPa, it is not possible to suppress tensile deformation and the tire durability is reduced. Conversely, if the dynamic elastic modulus $E'_B$ is greater than 15.0 MPa, the dynamic elastic modulus is too large and the tire is excessively reinforced. On the other hand, when the dynamic elastic modulus $E'_R$ at 60° C. of the rubber composition of the side reinforcing layer 9 is less than 7.0 MPa, the reinforcing effect of the side reinforcing layer 9 is not sufficiently obtained, and the run-flat durability is reduced. Conversely, if the dynamic elastic modulus $E'_R$ is greater than 15.0 MPa, the dynamic elastic modulus is too large and the tire is excessively reinforced.

If the value $T_B$ of tan δ at 60° C. of the rubber composition of the bead filler 6 is greater than 0.06, it is not possible to suppress heat build-up due to repeated deformation, so the tire durability is reduced. Likewise, if the value $T_R$ of tan δ at 60° C. of the rubber composition of the side reinforcing layer 9 is greater than 0.05, it is not possible to suppress heat build-up due to repeated deformation, so the run-flat durability is reduced. Preferably, the lower limit values $T_B$ and $T_R$ of tan δ are 0.01, from the point of view of productivity and material cost.

In the present technology, preferably, the dynamic elastic modulus $E'_B$ of the bead filler 6 and the dynamic elastic modulus $E'_R$ of the side reinforcing layer 9 satisfy the relationship $E'_B \leq E'_R$. As a result, local differences in rigidity in the side wall portion 2 are suppressed, and it is possible to effectively achieve both run-flat durability and riding comfort. At this time, if the size relationship of the dynamic elastic modulus $E'_B$ and the dynamic elastic modulus $E'_R$ is reversed, and the relationship becomes $E'_B > E'_R$, the riding comfort and the run-flat durability are poor, and it is difficult to achieve them both.

Figure 2:
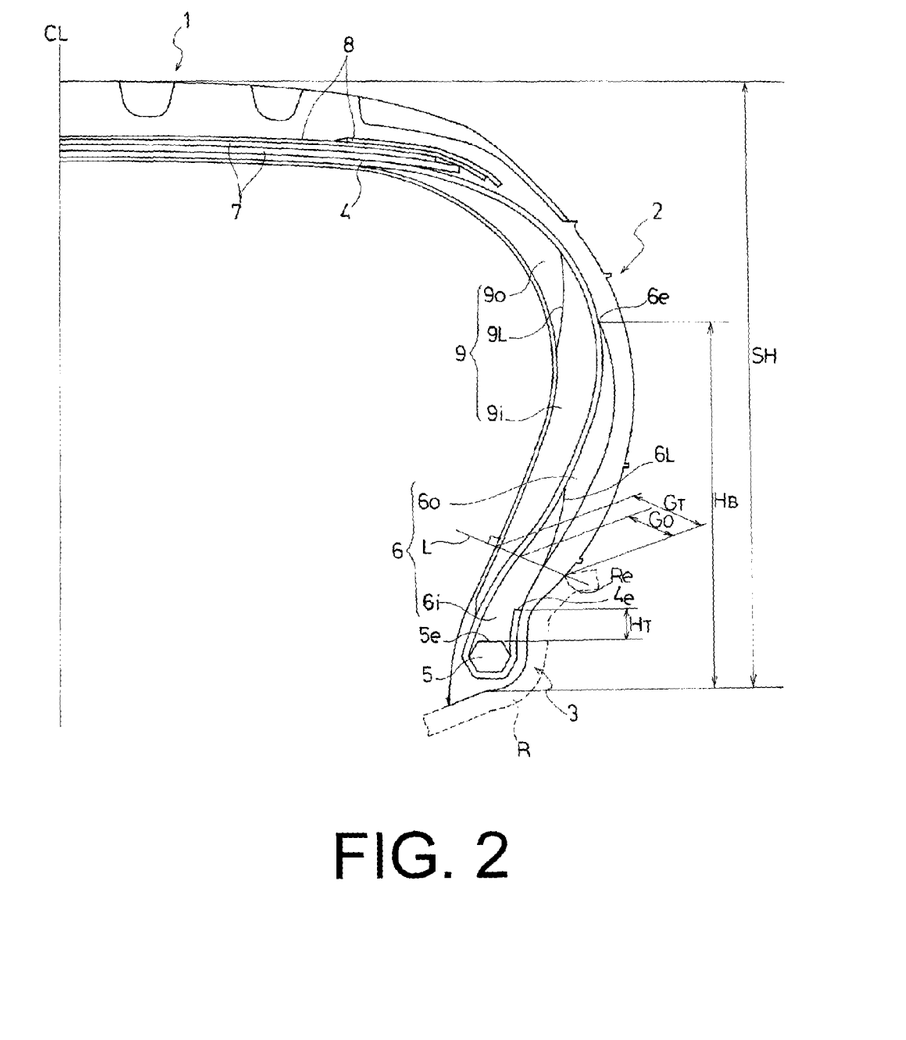
FIG. 2 is a meridian cross-sectional view illustrating a pneumatic tire according to other embodiments of the present technology.

In the example illustrated in FIG. 1, the bead filler 6 and the side reinforcing layer 9 are constituted by one type of rubber composition. However, it is possible for the bead filler 6 and the side reinforcing layer 9 to be each constituted by two types of rubber compositions laminated in the tire radial direction, as illustrated in FIG. 2. The embodiment in FIG. 2 has the same configuration as the embodiment in FIG. 1 described above, and the same reference numerals have been applied to the members which are configured as described above, apart from the 2-layer structure of the bead filler 6 and the side reinforcing layer 9.

In particular, in the present technology, preferably, the side reinforcing layer 9 is configured by laminating two types of rubber compositions having different dynamic elastic moduli at 60° C. in the tire radial direction. At this time, preferably, the dynamic elastic modulus $E'_{RO}$ at 60° C. of the rubber composition of the outer diameter side reinforcing layer 9o located on the outer side in the tire radial direction and the dynamic elastic modulus $E'_{RI}$ at 60° C. of the rubber composition of the inner diameter side reinforcing layer 9i located on the inner side in the tire radial direction satisfy the relationship $E'_{RO} < E'_{RI}$. By configuring the side reinforcing layer 9 in this matter, it is possible to relieve the input from the tire road contact surface without reducing the rigidity around the bead portion 5, and it is possible to improve the riding comfort when regular traveling without significantly reducing the run-flat durability.

At this time, preferably, the size relationship between the dynamic elastic modulus $E'_B$ of the bead filler 6 and the dynamic elastic moduli $E'_{RO}$, $E'_{RI}$ of the side reinforcing layer 9 satisfies the relationship between the dynamic elastic modulus $E'_B$ and dynamic elastic modulus $E'_{RI}$: $E'_B \leq E'_{RI}$. As a result, both run-flat durability and riding comfort when regular traveling can be more effectively achieved.

Also, in the present technology, preferably, the bead filler 6 is configured by laminating in the tire radial direction two types of rubber compositions having different dynamic elastic moduli at 60° C. At this time, preferably, the dynamic elastic modulus $E'_{BO}$ at 60° C. of the rubber composition of the outer diameter side bead filler 6o located on the outer side in the tire radial direction and the dynamic elastic modulus $E'_{BI}$ at 60° C. of the rubber composition of the inner diameter side bead filler 6i located on the inner side in the tire radial direction satisfy the relationship $E'_{BO} < E'_{BI}$. By configuring the bead filler 6 in this way, it is possible to further reinforce around the bead portion 5, and it is possible to reduce the rubber in the side reinforcing layer 9 and the side wall portion 2, and the volume of the bead filler 6. Also, the dynamic elastic modulus $E'_{BO}$ of the outer diameter side bead filler 6o is relatively low, so it is possible to suppress the vertical spring and achieve further improvement in the riding comfort, without a major reduction in the run-flat durability.

At this time, preferably, the size relationship between the dynamic elastic modulus $E'_R$ of the side reinforcing layer 9 and the dynamic elastic moduli $E'_{BO}$, $E'_{BI}$ of the bead filler 6 satisfies the relationship between the dynamic elastic modulus $E'_{BO}$ and dynamic elastic modulus $E'R$: $E'_{BO} \leq E'_R$. As a result, both run-flat durability and riding comfort when regular traveling can be more effectively achieved.

The cases in which the side reinforcing layer 9 has a 2-layer structure and the bead filler 6 has a 2-layer structure have been separately described, but preferably, as illustrated in FIG. 2, they are combined and the bead filler 6 and the side reinforcing layer 9 both have a 2-layer structure.

In this case, in addition to the dynamic elastic modulus $E'_{BO}$ of the rubber composition of the outer diameter side bead filler, the dynamic elastic modulus $E'_{BI}$ of the rubber composition of the inner diameter side bead filler, the dynamic elastic modulus $E'_{RO}$ of the rubber composition of the outer diameter side side reinforcing layer 9o, and the dynamic elastic modulus $E'_{RI}$ of the rubber composition of the inner diameter side side reinforcing layer 9i satisfying the above size relationship, preferably, also the size relationship $E'_{RO} < E'_{BO} < E'_{BI} < E'_{RI}$ is satisfied.

In the case of a 2-layer structure of the bead filler 6, the boundary 6L between the outer diameter side bead filler 6o and the inner diameter side bead filler 6i may be positioned from not less than 15% and not more than 45% of the tire cross-section height SH. In the case of a 2-layer structure of the side reinforcing layer 9, the boundary 9L between the side reinforcing layer 9o on the outer diameter side and the side reinforcing layer 9i on the inner diameter side may be positioned from not less than 45% and not more than 75% of the tire cross-section height SH. In this case, if the boundaries 6L, 9L are inclined with respect to the tire axial direction as illustrated in FIG. 2, it is sufficient that their midpoints be included in the above ranges.

In the present technology, a belt cover layer 8 disposed on an outer side in the radial direction of the belt layer 7 is preferably constituted by a composite cord including two types of organic fibers having differing properties. It is particularly preferable that this composite cord includes an organic fiber having relatively high shrinkage and low elasticity and an organic fiber having relatively low shrinkage and high elasticity. By using the composite cord described above for the belt cover layer 8, buckling of the crown portion when run-flat traveling can be effectively suppressed and run-flat durability, steering stability, and riding comfort can be enhanced.

Examples of the organic fibers having relatively high shrinkage and low elasticity as described above include nylon fibers and the like; and examples of the organic fibers having relatively low shrinkage and high elasticity include aramid fibers and the like.

EXAMPLES

In pneumatic tires having a tire size of 235/50R18, 42 types of test tires of Conventional Example 1, Comparative Examples 1 to 18, and Working Examples 1 to 23 were manufactured. The basic tire cross-sectional structure was the same as in FIG. 2. The carcass layer turned-up height $H_T$, the ratio of the distance $G_O$ from the tire outer surface to the carcass layer to the total gauge $G_T$ of the side wall portion on the imaginary line L, the ratio of the bead filler height $H_B$ to the tire cross-section height SH, the hardness $Hs_B$ at 20° C. of the rubber composition of the bead filler, the hardness $Hs_R$ at 20° C. of the rubber composition of the side reinforcing layer, the dynamic elastic modulus $E'_B$ (inner diameter side $E'_{BI}$ and outer diameter side $E'_{BO}$) at 60° C. of the rubber composition of the bead filler, the dynamic elastic modulus E'R (inner diameter side $E'_{RI}$ and outer diameter side E'RO) at 60° C. of the rubber composition of the side reinforcing layer, the value $T_B$ of tan δ at 60° C. of the rubber composition of the bead filler, the value $T_R$ of tan δ at 60° C. of the rubber composition of the side reinforcing layer, the cross-sectional area $V_B$ of the bead filler, the cross-sectional area $V_R$ of the side reinforcing layer, the cross-sectional area ratio $V_B/V_R$, and the belt cover layer material were set as shown in Tables 1 to 5.

Cases where the bead filler or the side reinforcing layer were constituted by one type of rubber composition are indicated by inserting the same values in the columns for the inner diameter side $E'_{BI}$ and the outer diameter side $E'_{BO}$ of the dynamic elastic modulus at 60° C. of the rubber composition of the bead filler, and the inner diameter side $E'_{RI}$ and the outer diameter side $E'_{RO}$ of the dynamic elastic modulus at 60° C. of the rubber composition of the side reinforcing layer.

Also, in the case of a 2-layer structure of the bead filler or the side reinforcing layer, the boundary between the inner diameter side bead filler and the outer diameter side bead filler was positioned at 30% of the tire cross-section height SH, and the boundary between the inner diameter side side reinforcing layer and the outer diameter side side reinforcing layer was positioned at 60% of the tire cross-section height SH.

Run-flat durability and riding comfort when regular traveling were evaluated for each of the 42 types of test tires in accordance with the methods described below. The results are shown in Tables 1 to 5.

The run-flat durability test tire was assembled on a major rim (size: 18×7.5 J), mounted on a vehicle, and inflated to an air pressure of 230 kPa. The valve core of the right side drive axle tire (one of the four tires) was removed and the vehicle was run on an asphalt road surface test course at an average speed of 80 km/h. Running was continued until the driver felt vibration caused by the breakdown of the tire. Run-flat durability was measured based on the average running distance. Three test drivers performed this measurement and the results were averaged as evaluations of run-flat durability. Evaluation results were expressed as index vales, Comparative Example 1 being assigned an index value of 100. Larger index values indicate superior run-flat durability. When the index value is 105 or greater, the run-flat durability is particularly excellent, which is preferable. When the index value is 110 or greater, it is more preferable.

Riding Comfort when Regular Traveling

Each test tire was assembled on a major rim (size: 18×7.5 J), mounted on a vehicle, and all of the tires were inflated to an air pressure of 230 kPa. Sensory evaluation by a test driver for riding comfort when regular traveling was performed on a test course. Evaluation results were expressed as index values, Conventional Example 1 being assigned an index value of 100. Larger index values indicate superior riding comfort when regular traveling.

When the index value is 105 or greater, the riding comfort when regular traveling is particularly excellent, which is preferable.

TABLE 1

| | | | | Conv. Ex. 1 | Comp. Ex. 1 | Comp. Ex. 2 | Comp. Ex. 3 |
|---|---|---|---|---|---|---|---|
| Carcass layer turned up height $H_T$ | | | mm | 50 | 50 | 50 | 50 |
| Distance between tire outer surface and carcass layer $G_o$ [$G_T$ ratio] | | | % | 10 | 10 | 10 | 65 |
| Bead filler height $H_B$ [SH ratio] | | | % | 35 | 35 | 35 | 35 |
| Hardness | Side reinforcing layer $Hs_R$ | | | 74 | 74 | 74 | 74 |
| | Bead filler $Hs_B$ | | | 90 | 90 | 90 | 90 |
| Dynamic elastic modulus | Side reinforcing layer $E'_R$ | Inner diameter side $E'_{RI}$ | MPa | 9.0 | 9.0 | 9.0 | 9.0 |
| | | Outer diameter side $E'_{RO}$ | MPa | 9.0 | 9.0 | 9.0 | 9.0 |
| | Bead filler $E'_B$ | Inner diameter side $E'_{BI}$ | MPa | 9.0 | 9.0 | 9.0 | 9.0 |
| | | Outer diameter side $E'_{BO}$ | MPa | 9.0 | 9.0 | 9.0 | 9.0 |
| tanδ | Side reinforcing layer $T_R$ | | | 0.08 | 0.05 | 0.05 | 0.05 |
| | Bead filler $T_B$ | | | 0.10 | 0.06 | 0.06 | 0.06 |
| Cross-sectional area | Side reinforcing layer $V_R$ | | cm$^2$ | 7.2 | 7.2 | 6.0 | 6.0 |
| | Bead filler $V_B$ | | cm$^2$ | 1.4 | 1.4 | 3.0 | 3.0 |
| Cross-sectional area ratio $V_B/V_R$ | | | | 0.2 | 0.2 | 0.5 | 0.5 |
| Material of the belt cover layer | | | | Nylon fiber | Nylon fiber | Nylon fiber | Nylon fiber |
| Run-flat durability | | | Index value | 90 | 100 | 102 | 107 |
| Riding comfort | | | Index value | 100 | 100 | 90 | 90 |

| | | | | W. E. 1 | W. E. 2 | Comp. Ex. 4 | W. E. 3 | Comp. Ex. 5 |
|---|---|---|---|---|---|---|---|---|
| Carcass layer turned up height $H_T$ | | | mm | 8 | 10 | 15 | 8 | 8 |
| Distance between tire outer surface and carcass layer $G_o$ [$G_T$ ratio] | | | % | 65 | 65 | 65 | 50 | 40 |
| Bead filler height $H_B$ [SH ratio] | | | % | 60 | 60 | 60 | 60 | 60 |
| Hardness | Side reinforcing layer $Hs_R$ | | | 78 | 78 | 78 | 78 | 78 |
| | Bead filler $Hs_B$ | | | 72 | 72 | 72 | 72 | 72 |
| Dynamic elastic modulus | Side reinforcing layer $E'_R$ | Inner diameter side $E'_{RI}$ | MPa | 9.0 | 9.0 | 9.0 | 9.0 | 9.0 |
| | | Outer diameter side $E'_{RO}$ | MPa | 9.0 | 9.0 | 9.0 | 9.0 | 9.0 |
| | Bead filler $E'_B$ | Inner diameter side $E'_{BI}$ | MPa | 9.0 | 9.0 | 9.0 | 9.0 | 9.0 |
| | | Outer diameter side $E'_{BO}$ | MPa | 9.0 | 9.0 | 9.0 | 9.0 | 9.0 |
| tanδ | Side reinforcing layer $T_R$ | | | 0.05 | 0.05 | 0.05 | 0.05 | 0.05 |
| | Bead filler $T_B$ | | | 0.06 | 0.06 | 0.06 | 0.06 | 0.06 |
| Cross-sectional area | Side reinforcing layer $V_R$ | | cm$^2$ | 5.2 | 5.2 | 5.2 | 5.2 | 5.2 |
| | Bead filler $V_B$ | | cm$^2$ | 2.6 | 2.6 | 2.6 | 2.6 | 2.6 |
| Cross-sectional area ratio $V_B/V_R$ | | | | 0.5 | 0.5 | 0.5 | 0.5 | 0.5 |
| Material of the belt cover layer | | | | Nylon fiber | Nylon fiber | Nylon fiber | Nylon fiber | Nylon fiber |

TABLE 1-continued

| | | | | | | |
|---|---|---|---|---|---|---|
| Run-flat durability | Index value | 104 | 104 | 104 | 100 | 95 |
| Riding comfort | Index value | 104 | 100 | 95 | 104 | 104 |

In Table 1, "Conv. Ex." is an abbreviation for "Conventional Example"; "W.E." is an abbreviation for "Working Example"; and "Comp. Ex." is an abbreviation for "Comparative Example."

TABLE 2

| | | | | Comp. Ex. 6 | W. E. 4 | W. E. 5 | Comp. Ex. 7 |
|---|---|---|---|---|---|---|---|
| Carcass layer turn-up height $H_T$ | | | mm | 8 | 8 | 8 | 8 |
| Distance between tire outer surface and carcass layer $G_o$ [$G_T$ ratio] | | | % | 65 | 65 | 65 | 65 |
| Bead filler height HB [SH ratio] | | | % | 40 | 50 | 80 | 90 |
| Hardness | Side reinforcing layer $Hs_R$ | | | 78 | 78 | 78 | 78 |
| | Bead filler $Hs_B$ | | | 72 | 72 | 72 | 72 |
| Dynamic elastic modulus | Side reinforcing layer $E'_R$ | Inner diameter side $E'_{RI}$ | MPa | 9.0 | 9.0 | 9.0 | 9.0 |
| | | Outer diameter side $E'_{RO}$ | MPa | 9.0 | 9.0 | 9.0 | 9.0 |
| | Bead filler $E'B$ | Inner diameter side $E'_{BI}$ | MPa | 9.0 | 9.0 | 9.0 | 9.0 |
| | | Outer diameter side $E'_{BO}$ | MPa | 9.0 | 9.0 | 9.0 | 9.0 |
| tanδ | Side reinforcing layer $T_R$ | | | 0.05 | 0.05 | 0.05 | 0.05 |
| | Bead filler $T_B$ | | | 0.06 | 0.06 | 0.06 | 0.06 |
| Cross-sectional area | Side reinforcing layer $V_R$ | | cm$^2$ | 5.2 | 5.2 | 5.2 | 5.2 |
| | Bead filler $V_B$ | | cm$^2$ | 2.6 | 2.6 | 2.6 | 2.6 |
| Cross-sectional area ratio $V_B/V_R$ | | | | 0.5 | 0.5 | 0.5 | 0.5 |
| Material of the belt cover layer | | | | Nylon fiber | Nylon fiber | Nylon fiber | Nylon fiber |
| Run-flat durability | | | Index value | 95 | 100 | 102 | 104 |
| Riding comfort | | | Index value | 104 | 102 | 100 | 95 |

| | | | | Comp. Ex. 8 | W. E. 6 | W. E. 7 | Comp. Ex. 9 |
|---|---|---|---|---|---|---|---|
| Carcass layer turn-up height $H_T$ | | | mm | 8 | 8 | 8 | 8 |
| Distance between tire outer surface and carcass layer $G_o$ [$G_T$ ratio] | | | % | 65 | 65 | 65 | 65 |
| Bead filler height HB [SH ratio] | | | % | 60 | 60 | 60 | 60 |
| Hardness | Side reinforcing layer $Hs_R$ | | | 78 | 78 | 78 | 78 |
| | Bead filler $Hs_B$ | | | 72 | 72 | 72 | 72 |
| Dynamic elastic modulus | Side reinforcing layer $E'_R$ | Inner diameter side $E'_{RI}$ | MPa | 9.0 | 9.0 | 9.0 | 9.0 |
| | | Outer diameter side $E'_{RO}$ | MPa | 9.0 | 9.0 | 9.0 | 9.0 |
| | Bead filler $E'B$ | Inner diameter side $E'_{BI}$ | MPa | 9.0 | 9.0 | 9.0 | 9.0 |
| | | Outer diameter side $E'_{BO}$ | MPa | 9.0 | 9.0 | 9.0 | 9.0 |
| tanδ | Side reinforcing layer $T_R$ | | | 0.05 | 0.05 | 0.05 | 0.05 |
| | Bead filler $T_B$ | | | 0.06 | 0.06 | 0.06 | 0.06 |
| Cross-sectional area | Side reinforcing layer $V_R$ | | cm$^2$ | 5.2 | 5.2 | 5.2 | 5.2 |
| | Bead filler $V_B$ | | cm$^2$ | 1.6 | 2.1 | 3.1 | 3.6 |
| Cross-sectional area ratio $V_B/V_R$ | | | | 0.3 | 0.4 | 0.6 | 0.7 |
| Material of the belt cover layer | | | | Nylon fiber | Nylon fiber | Nylon fiber | Nylon fiber |

TABLE 2-continued

| | | | | | |
|---|---|---|---|---|---|
| Run-flat durability | Index value | 104 | 102 | 100 | 95 |
| Riding comfort | Index value | 95 | 100 | 102 | 104 |

In Table 2, "W.E." is an abbreviation for "Working Example"; and "Comp. Ex." is an abbreviation for "Comparative Example."

TABLE 3

| | | | | Comp. Ex. 10 | W. E. 8 | W. E. 9 | Comp. Ex. 11 | Comp. Ex. 12 |
|---|---|---|---|---|---|---|---|---|
| Carcass layer turned up height $H_T$ | | | mm | 8 | 8 | 8 | 8 | 8 |
| Distance between tire outer surface and carcass layer $G_o$ [$G_T$ ratio] | | | % | 65 | 65 | 65 | 65 | 65 |
| Bead filler height $H_B$ [SH ratio] | | | % | 60 | 60 | 60 | 60 | 60 |
| Hardness | Side reinforcing layer $Hs_R$ | | | 78 | 78 | 78 | 78 | 70 |
| | Bead filler $Hs_B$ | | | 60 | 65 | 80 | 85 | 72 |
| Dynamic elastic modulus | Side reinforcing layer $E'_R$ | Inner diameter side $E'_{RI}$ | MPa | 9.0 | 9.0 | 9.0 | 9.0 | 9.0 |
| | | Outer diameter side $E'_{RO}$ | MPa | 9.0 | 9.0 | 9.0 | 9.0 | 9.0 |
| | Bead filler $E'_B$ | Inner diameter side $E'_{BI}$ | MPa | 9.0 | 9.0 | 9.0 | 9.0 | 9.0 |
| | | Outer diameter side $E'_{BO}$ | MPa | 9.0 | 9.0 | 9.0 | 9.0 | 9.0 |
| tanδ | Side reinforcing layer $T_R$ | | | 0.05 | 0.05 | 0.05 | 0.05 | 0.05 |
| | Bead filler $T_B$ | | | 0.06 | 0.06 | 0.06 | 0.06 | 0.06 |
| Cross-sectional area | Side reinforcing layer $V_R$ | | cm² | 5.2 | 5.2 | 5.2 | 5.2 | 5.2 |
| | Bead filler $V_B$ | | cm² | 2.6 | 2.6 | 2.6 | 2.6 | 2.6 |
| Cross-sectional area ratio $V_B/V_R$ | | | | 0.5 | 0.5 | 0.5 | 0.5 | 0.5 |
| Material of the belt cover layer | | | | Nylon fiber | Nylon fiber | Nylon fiber | Nylon fiber | Nylon fiber |
| Run-flat durability | | | Index value | 95 | 100 | 102 | 104 | 95 |
| Riding comfort | | | Index value | 104 | 102 | 100 | 95 | 104 |

| | | | | W. E. 10 | W. E. 11 | Comp. Ex. 13 | Comp. Ex. 14 |
|---|---|---|---|---|---|---|---|
| Carcass layer turned up height $H_T$ | | | mm | 8 | 8 | 8 | 8 |
| Distance between tire outer surface and carcass layer $G_o$ [$G_T$ ratio] | | | % | 65 | 65 | 65 | 65 |
| Bead filler height $H_B$ [SH ratio] | | | % | 60 | 60 | 60 | 60 |
| Hardness | Side reinforcing layer $Hs_R$ | | | 75 | 85 | 90 | 72 |
| | Bead filler $Hs_B$ | | | 72 | 72 | 72 | 78 |
| Dynamic elastic modulus | Side reinforcing layer $E'_R$ | Inner diameter side $E'_{RI}$ | MPa | 9.0 | 9.0 | 9.0 | 9.0 |
| | | Outer diameter side $E'_{RO}$ | MPa | 9.0 | 9.0 | 9.0 | 9.0 |
| | Bead filler $E'_B$ | Inner diameter side $E'_{BI}$ | MPa | 9.0 | 9.0 | 9.0 | 9.0 |
| | | Outer diameter side $E'_{BO}$ | MPa | 9.0 | 9.0 | 9.0 | 9.0 |
| tanδ | Side reinforcing layer $T_R$ | | | 0.05 | 0.05 | 0.05 | 0.05 |
| | Bead filler $T_B$ | | | 0.06 | 0.06 | 0.06 | 0.06 |
| Cross-sectional area | Side reinforcing layer $V_R$ | | cm² | 5.2 | 5.2 | 5.2 | 5.2 |
| | Bead filler $V_B$ | | cm² | 2.6 | 2.6 | 2.6 | 2.6 |
| Cross-sectional area ratio $V_B/V_R$ | | | | 0.5 | 0.5 | 0.5 | 0.5 |
| Material of the belt cover layer | | | | Nylon fiber | Nylon fiber | Nylon fiber | Nylon fiber |

TABLE 3-continued

| | | | | | |
|---|---|---|---|---|---|
| Run-flat durability | Index value | 100 | 102 | 104 | 95 |
| Riding comfort | Index value | 102 | 100 | 95 | 104 |

In Table 3, "W.E." is an abbreviation for "Working Example"; and "Comp. Ex." is an abbreviation for "Comparative Example."

TABLE 4

| | | | | Comp. Ex. 15 | W. E. 12 | W. E. 13 | Comp. Ex. 16 |
|---|---|---|---|---|---|---|---|
| Carcass layer turn-up height $H_T$ | | | mm | 8 | 8 | 8 | 8 |
| Distance between tire outer surface and carcass layer $G_o$ [$G_T$ ratio] | | | % | 65 | 65 | 65 | 65 |
| Bead filler height $H_B$ [SH ratio] | | | % | 60 | 60 | 60 | 60 |
| Hardness | Side reinforcing layer $Hs_R$ | | | 78 | 78 | 78 | 78 |
| | Bead filler $Hs_B$ | | | 72 | 72 | 72 | 72 |
| Dynamic elastic modulus | Side reinforcing layer $E'_R$ | Inner diameter side $E'_{RI}$ | MPa | 6.0 | 7.0 | 15.0 | 16.0 |
| | | Outer diameter side $E'_{RO}$ | MPa | 6.0 | 7.0 | 15.0 | 16.0 |
| | Bead filler $E'_B$ | Inner diameter side $E'_{BI}$ | MPa | 6.0 | 7.0 | 15.0 | 16.0 |
| | | Outer diameter side $E'_{BO}$ | MPa | 6.0 | 7.0 | 15.0 | 16.0 |
| tanδ | Side reinforcing layer $T_R$ | | | 0.05 | 0.05 | 0.05 | 0.05 |
| | Bead filler $T_B$ | | | 0.06 | 0.06 | 0.06 | 0.06 |
| Cross-sectional area | Side reinforcing layer $V_R$ | | cm² | 5.2 | 5.2 | 5.2 | 5.2 |
| | Bead filler $V_B$ | | cm² | 2.6 | 2.6 | 2.6 | 2.6 |
| Cross-sectional area ratio $V_B/V_R$ | | | | 0.5 | 0.5 | 0.5 | 0.5 |
| Material of the belt cover layer | | | | Nylon fiber | Nylon fiber | Nylon fiber | Nylon fiber |
| Run-flat durability | | | Index value | 95 | 100 | 102 | 104 |
| Riding comfort | | | Index value | 104 | 102 | 100 | 95 |

| | | | | Comp. Ex. 17 | Comp. Ex. 18 | W. E. 14 | W. E. 15 |
|---|---|---|---|---|---|---|---|
| Carcass layer turn-up height $H_T$ | | | mm | 8 | 8 | 8 | 8 |
| Distance between tire outer surface and carcass layer $G_o$ [$G_T$ ratio] | | | % | 65 | 65 | 65 | 65 |
| Bead filler height $H_B$ [SH ratio] | | | % | 60 | 60 | 60 | 60 |
| Hardness | Side reinforcing layer $Hs_R$ | | | 78 | 78 | 78 | 78 |
| | Bead filler $Hs_B$ | | | 72 | 72 | 72 | 72 |
| Dynamic elastic modulus | Side reinforcing layer $E'_R$ | Inner diameter side $E'_{RI}$ | MPa | 9.0 | 9.0 | 12.0 | 10.0 |
| | | Outer diameter side $E'_{RO}$ | MPa | 9.0 | 9.0 | 12.0 | 10.0 |
| | Bead filler $E'_B$ | Inner diameter side $E'_{BI}$ | MPa | 9.0 | 9.0 | 10.0 | 12.0 |
| | | Outer diameter side $E'_{BO}$ | MPa | 9.0 | 9.0 | 10.0 | 12.0 |
| tanδ | Side reinforcing layer $T_R$ | | | 0.07 | 0.05 | 0.05 | 0.05 |
| | Bead filler $T_B$ | | | 0.06 | 0.08 | 0.06 | 0.06 |
| Cross-sectional area | Side reinforcing layer $V_R$ | | cm² | 5.2 | 5.2 | 5.2 | 5.2 |
| | Bead filler $V_B$ | | cm² | 2.6 | 2.6 | 2.6 | 2.6 |
| Cross-sectional area ratio $V_B/V_R$ | | | | 0.5 | 0.5 | 0.5 | 0.5 |
| Material of the belt cover layer | | | | Nylon fiber | Nylon fiber | Nylon fiber | Nylon fiber |

TABLE 4-continued

| | | | | | |
|---|---|---|---|---|---|
| Run-flat durability | Index value | 95 | 95 | 114 | 108 |
| Riding comfort | Index value | 104 | 104 | 108 | 104 |

In Table 4, "W.E." is an abbreviation for "Working Example"; and "Comp. Ex." is an abbreviation for "Comparative Example."

TABLE 5

| | | | | W. E. 16 | W. E. 17 | W. E. 18 | W. E. 19 |
|---|---|---|---|---|---|---|---|
| Carcass layer turn-up height $H_T$ | | | mm | 8 | 8 | 8 | 8 |
| Distance between tire outer surface and carcass layer $G_o$ [$G_T$ ratio] | | | % | 65 | 65 | 65 | 65 |
| Bead filler height $H_B$ [SH ratio] | | | % | 60 | 60 | 60 | 60 |
| Hardness | Side reinforcing layer $Hs_R$ | | | 78 | 78 | 78 | 78 |
| | Bead filler $Hs_B$ | | | 72 | 72 | 72 | 72 |
| Dynamic elastic modulus | Side reinforcing layer $E'_R$ | Inner diameter side $E'_{RI}$ | MPa | 15.0 | 7.0 | 9.0 | 12.0 |
| | | Outer diameter side $E'_{RO}$ | MPa | 7.0 | 15.0 | 7.0 | 12.0 |
| | Bead filler $E'_B$ | Inner diameter side $E'_{BI}$ | MPa | 10.0 | 10.0 | 10.0 | 14.0 |
| | | Outer diameter side $E'_{BO}$ | MPa | 10.0 | 10.0 | 10.0 | 8.0 |
| tanδ | Side reinforcing layer $T_R$ | | | 0.05 | 0.05 | 0.05 | 0.05 |
| | Bead filler $T_B$ | | | 0.06 | 0.06 | 0.06 | 0.06 |
| Cross-sectional area | Side reinforcing layer $V_R$ | | cm² | 5.2 | 5.2 | 5.2 | 5.2 |
| | Bead filler $V_B$ | | cm² | 2.6 | 2.6 | 2.6 | 2.6 |
| Cross-sectional area ratio $V_B/V_R$ | | | | 0.5 | 0.5 | 0.5 | 0.5 |
| Material of the belt cover layer | | | | Nylon fiber | Nylon fiber | Nylon fiber | Nylon fiber |
| Run-flat durability | | | Index value | 112 | 108 | 108 | 112 |
| Riding comfort | | | Index value | 112 | 104 | 104 | 112 |

| | | | | W. E. 20 | W. E. 21 | W. E. 22 | W. E. 23 |
|---|---|---|---|---|---|---|---|
| Carcass layer turn-up height $H_T$ | | | mm | 8 | 8 | 8 | 8 |
| Distance between tire outer surface and carcass layer $G_o$ [GT ratio] | | | % | 65 | 65 | 65 | 65 |
| Bead filler height $H_B$ [SH ratio] | | | % | 60 | 60 | 60 | 60 |
| Hardness | Side reinforcing layer $Hs_R$ | | | 78 | 78 | 78 | 78 |
| | Bead filler $Hs_B$ | | | 72 | 72 | 72 | 72 |
| Dynamic elastic modulus | Side reinforcing layer $E'_R$ | Inner diameter side $E'_{RI}$ | MPa | 12.0 | 12.0 | 15.0 | 15.0 |
| | | Outer diameter side $E'_{RO}$ | MPa | 12.0 | 12.0 | 7.0 | 7.0 |
| | Bead filler $E'_B$ | Inner diameter side $E'_{BI}$ | MPa | 8.0 | 14.0 | 14.0 | 14.0 |
| | | Outer diameter side $E'_{BO}$ | MPa | 14.0 | 13.0 | 8.0 | 8.0 |
| tanδ | Side reinforcing layer $T_R$ | | | 0.05 | 0.05 | 0.05 | 0.05 |
| | Bead filler $T_B$ | | | 0.06 | 0.06 | 0.06 | 0.06 |
| Cross-sectional area | Side reinforcing layer $V_R$ | | cm² | 4.6 | 5.2 | 4.6 | 4.6 |
| | Bead filler $V_B$ | | cm² | 2.3 | 2.6 | 2.3 | 2.3 |
| Cross-sectional area ratio $V_B/V_R$ | | | | 0.5 | 0.5 | 0.5 | 0.5 |
| Material of the belt cover layer | | | | Nylon fiber | Nylon fiber | Nylon fiber | Nylon/aramid |

TABLE 5-continued

| Run-flat durability | Index value | 108 | 108 | 112 | 114 |
| Riding comfort | Index value | 104 | 104 | 114 | 114 |

In Table 5, "W.E." is an abbreviation for "Working Example."

As can be seen from Tables 1 to 5, each of Working Examples 1 to 23 had improved run-flat durability and riding comfort when regular traveling compared with Conventional Example 1 and Comparative Examples 1 to 18.

In particular, in Working Example 14, in which the dynamic elastic modulus of the side reinforcing layer was greater than the dynamic elastic modulus of the bead filler, particularly, the run-flat durability was improved greatly, while achieving both run-flat durability and riding comfort when regular traveling. Also, both run-flat durability and riding comfort when regular traveling were achieved in a well-balanced manner for Working Examples 16, 19, and 22, in which the dynamic elastic modulus of the side reinforcing layer and/or the bead filler were constituted by two different types of rubber compositions and the dynamic elastic modulus on the inner diameter side in each layer was greater than the dynamic elastic modulus on the outer diameter side, as well as for Working Example 23 in which the belt cover layer was formed from nylon/aramid composite fiber.

On the other hand, for the Comparative Examples 1 to 18 for which any of the carcass layer turn-up height $H_T$, the distance $G_O$, the bead filler height $H_B$, the cross-sectional area ratio $V_B/V_R$, the hardness, dynamic elastic modulus, and tan δ did not satisfy the prescriptions of the present technology, the run-flat durability and/or the riding comfort when regular traveling were poor.

What is claimed is:

1. A pneumatic tire comprising at least one layer of carcass layer mounted between a pair of left and right bead portions, the carcass layer being folded from the tire inside to the tire outside around bead cores disposed in each bead portion, a bead filler constituted by a rubber composition being disposed on an outer circumferential side of the bead cores, and a plurality of belt layers being disposed on an outer circumferential side of the carcass layer in a tread portion, a plurality of belt cover layers being disposed on an outer circumferential side of the belt layers, and a falcated cross-section side reinforcing layer being disposed inward in a tire width direction of the carcass layer in side wall portions; wherein
   a height $H_T$ from a turned-up edge of the carcass layer to an outer edge in a tire radial direction of the bead core is not more than 10 mm;
   when fitted to a rim, on an imaginary line L drawn from an outermost edge in the tire radial direction of a region in contact with a rim flange normal to a tire inner surface, a distance $G_O$ from a tire outer surface to the carcass layer is not less than 50% of a total gauge $G_T$ of the side wall portion on the imaginary line L;
   a height $H_B$ of the outer edge in the tire radial direction of the bead filler is from 50% to 80% of a tire cross-section height SH;
   a ratio $V_B/V_R$ of a cross-sectional area $V_B$ of the bead filler to a cross-sectional area $V_R$ of the side reinforcing layer is not less than 0.4 and not more than 0.6;
   a hardness $Hs_B$ at 20° C. of the rubber composition of the bead filler is not less than 65 and not more than 80;
   a hardness $Hs_R$ at 20° C. of the rubber composition of the side reinforcing layer is not less than 75 and not more than 85, the hardness $Hs_B$ and the hardness $Hs_R$ satisfy the relationship $Hs_B \leq Hs_R$;
   a dynamic elastic modulus $E'_B$ at 60° C. of the rubber composition of the bead filler is not less than 7.0 MPa and not more than 15.0 MPa;
   a dynamic elastic modulus $E'_R$ at 60° C. of the rubber composition of the side reinforcing layer is not less than 7.0 MPa and not more than 15.0 MPa;
   a value $T_B$ of tan δ at 60° C. of the rubber composition of the bead filler is not more than 0.06;
   a value $T_R$ of tan δ at 60° C. of the rubber composition of the side reinforcing layer is not more than 0.05; and
   the side reinforcing layer is constituted by two types of rubber compositions having different dynamic elastic moduli at 60° C. that are laminated in the tire radial direction; and a dynamic elastic modulus $E'_{RO}$ at 60° C. of the rubber composition of an outer diameter side side reinforcing layer located on the outer side in the tire radial direction and the dynamic elastic modulus $E'_{RI}$ at 60° C. of the rubber composition of an inner diameter side side reinforcing layer located on an inner side in the tire radial direction satisfy the relationship $E'_{RO} < E'_{RI}$.

2. The pneumatic tire according to claim 1, wherein the dynamic elastic modulus $E'_B$ and the dynamic elastic modulus $E'_{RI}$ satisfy the relationship $E'_B \leq E'_{RI}$.

3. The pneumatic tire according to claim 2, wherein the belt cover layer is constituted by a composite cord comprising two types of organic fibers having differing properties.

4. The pneumatic tire according to claim 3, wherein the composite cord comprises: an organic fiber having relatively high shrinkage, and low elasticity and an organic fiber having relatively low shrinkage and high elasticity.

5. The pneumatic tire according to claim 3, wherein the composite cord comprises: an organic fiber having relatively high shrinkage, and low elasticity and an organic fiber having relatively low shrinkage and high elasticity.

6. The pneumatic tire according to claim 1, wherein the bead filler is constituted by two types of rubber compositions having different dynamic elastic moduli at 60° C. that are laminated in the tire radial direction; and a dynamic elastic modulus $E'_{BO}$ at 60° C. of the rubber composition of an outer diameter side bead filler located on the outer side in the tire radial direction and a dynamic elastic modulus $E'_{BI}$ at 60° C. of the rubber composition of an inner diameter side bead filler located on the inner side in the tire radial direction satisfy the relationship $E'_{BO} < E'_{BI}$.

7. The pneumatic tire according to claim 6, wherein the belt cover layer is constituted by a composite cord comprising two types of organic fibers having differing properties.

8. The pneumatic tire according to claim 7, wherein the composite cord comprises: an organic fiber having relatively high shrinkage, and low elasticity and an organic fiber having relatively low shrinkage and high elasticity.

9. The pneumatic tire according to claim 6, wherein the dynamic elastic modulus $E'_{BO}$ and the dynamic elastic modulus $E'_R$ satisfy the relationship $E'_{BO} \leq E'_R$.

10. The pneumatic tire according to claim 9, wherein the belt cover layer is constituted by a composite cord comprising two types of organic fibers having differing properties.

11. The pneumatic tire according to claim 10, wherein the composite cord comprises: an organic fiber having relatively high shrinkage, and low elasticity and an organic fiber having relatively low shrinkage and high elasticity.

12. The pneumatic tire according to claim 1, wherein the belt cover layer is constituted by a composite cord comprising two types of organic fibers having differing properties.

13. The pneumatic tire according to claim 12, wherein the composite cord comprises: an organic fiber having relatively high shrinkage, and low elasticity and an organic fiber having relatively low shrinkage and high elasticity.

14. A pneumatic tire comprising at least one layer of carcass layer mounted between a pair of left and right bead portions, the carcass layer being folded from the tire inside to the tire outside around bead cores disposed in each bead portion, a bead filler constituted by a rubber composition being disposed on an outer circumferential side of the bead cores, and a plurality of belt layers being disposed on an outer circumferential side of the carcass layer in a tread portion, a plurality of belt cover layers being disposed on an outer circumferential side of the belt layers, and a falcated cross-section side reinforcing layer being disposed inward in a tire width direction of the carcass layer in side wall portions; wherein a height $H_T$ from a turned-up edge of the carcass layer to an outer edge in a tire radial direction of the bead core is not more than 10 mm;

when fitted to a rim, on an imaginary line L drawn from an outermost edge in the tire radial direction of a region in contact with a rim flange normal to a tire inner surface, a distance $G_O$ from a tire outer surface to the carcass layer is not less than 50% of a total gauge $G_T$ of the side wall portion on the imaginary line L;

a height $H_B$ of the outer edge in the tire radial direction of the bead filler is from 50% to 80% of a tire cross-section height SH;

a ratio $V_B/V_R$ of a cross-sectional area $V_B$ of the bead filler to a cross-sectional area $V_R$ of the side reinforcing layer is not less than 0.4 and not more than 0.6;

a hardness $Hs_B$ at 20° C. of the rubber composition of the bead filler is not less than 65 and not more than 80;

a hardness $Hs_R$ at 20° C. of the rubber composition of the side reinforcing layer is not less than 75 and not more than 85, the hardness $Hs_B$ and the hardness $Hs_R$ satisfy the relationship $Hs_B \leq Hs_R$;

a dynamic elastic modulus $E'_B$ at 60° C. of the rubber composition of the bead filler is not less than 7.0 MPa and not more than 15.0 MPa;

a dynamic elastic modulus $E'_R$ at 60° C. of the rubber composition of the side reinforcing layer is not less than 7.0 MPa and not more than 15.0 MPa;

a value $T_B$ of tan δ at 60° C. of the rubber composition of the bead filler is not more than 0.06;

a value $T_R$ of tan δ at 60° C. of the rubber composition of the side reinforcing layer is not more than 0.05; and the bead filler is constituted by two types of rubber compositions having different dynamic elastic moduli at 60° C. that are laminated in the tire radial direction; and a dynamic elastic modulus $E'_{BO}$ at 60° C. of the rubber composition of an outer diameter side bead filler located on the outer side in the tire radial direction and a dynamic elastic modulus $E'_{BI}$ at 60° C. of the rubber composition of an inner diameter side bead filler located on an inner side in the tire radial direction satisfy the relationship $E'_{BO} < E'_{BI}$.

* * * * *